May 2, 1950
G. L. BAKER
2,505,876
ELECTRIC STORAGE BATTERY
Filed Jan. 17, 1947
3 Sheets-Sheet 1
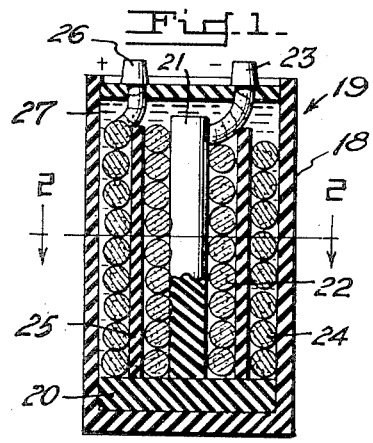
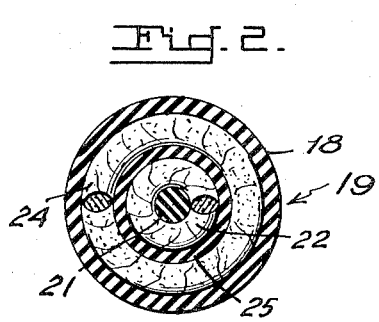
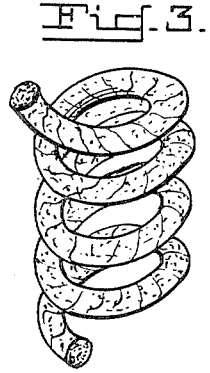
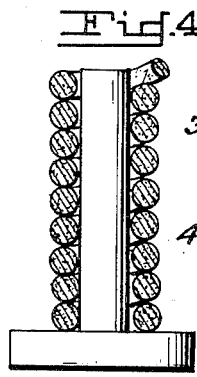
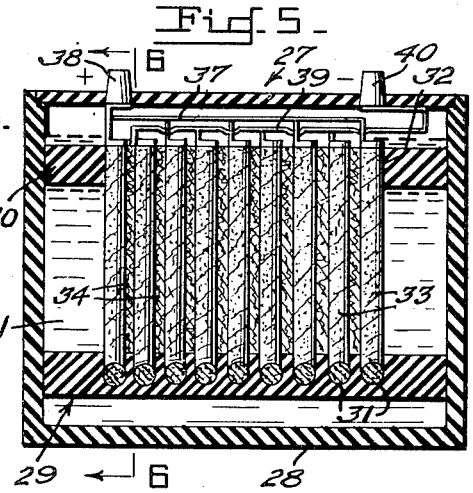
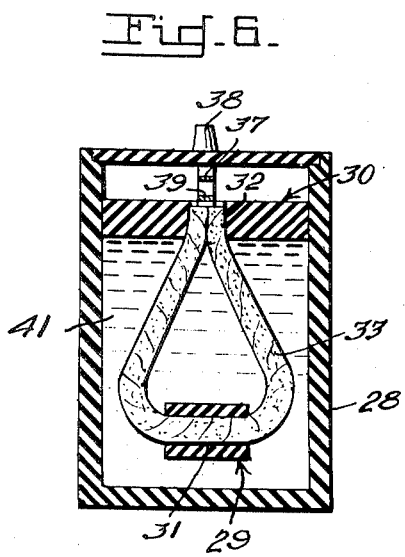
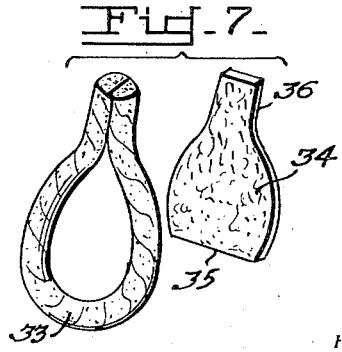
Inventor
George L. Baker
By Randolph & Beavers
Attorneys May 2, 1950                    G. L. BAKER                  2,505,876
ELECTRIC STORAGE BATTERY
Filed Jan. 17, 1947                                      3 Sheets-Sheet 2
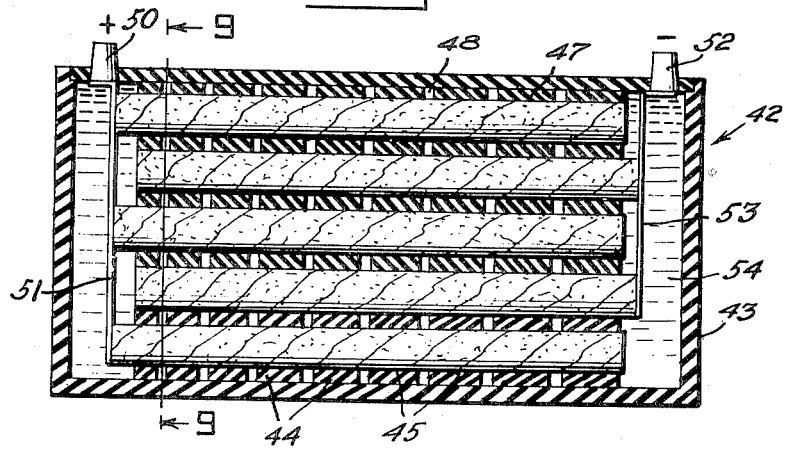
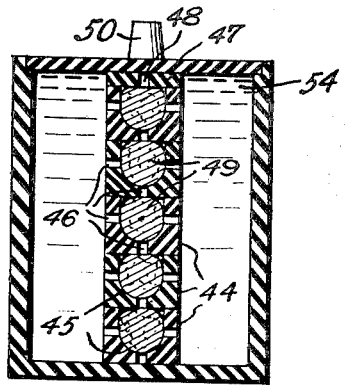
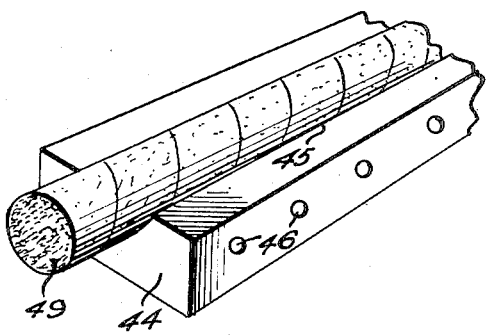
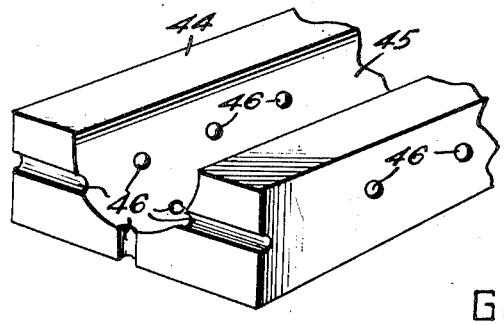
George L. Baker
By Randolph & Beavers
Attorneys May 2, 1950          G. L. BAKER          2,505,876
ELECTRIC STORAGE BATTERY
Filed Jan. 17, 1947          3 Sheets-Sheet 3
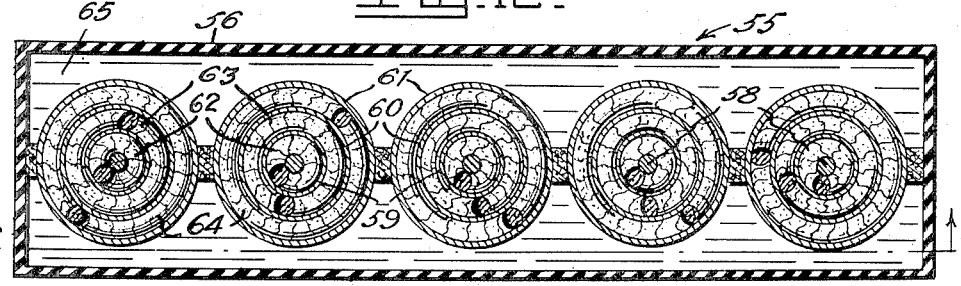
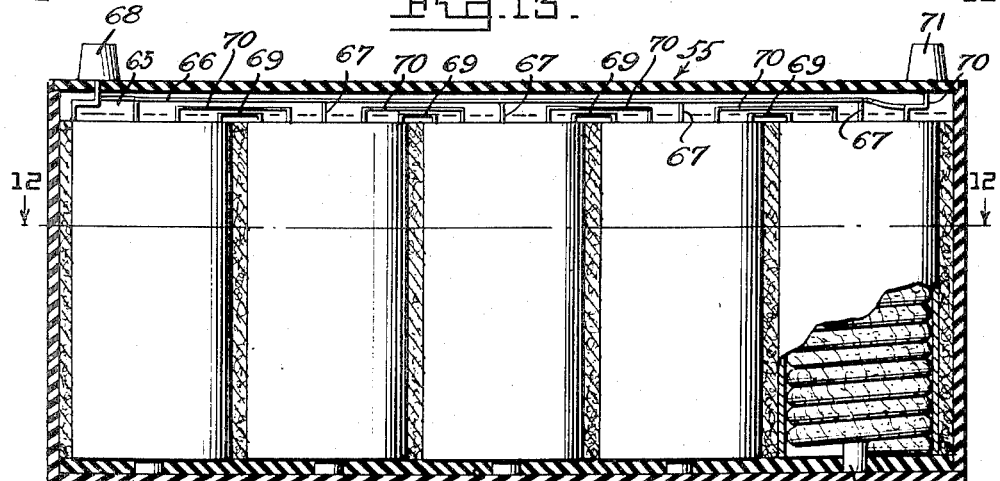
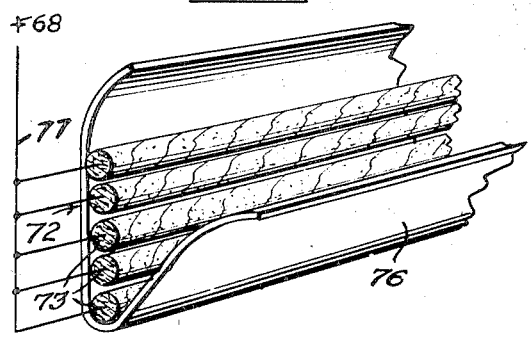
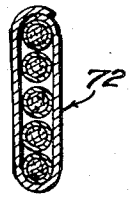
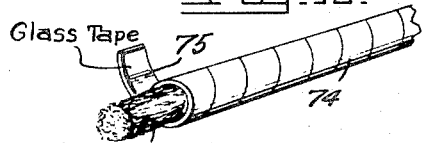
Inventor
George L. Baker
By Randolph & Beavers
Attorneys Patented May 2, 1950

2,505,876

UNITED STATES PATENT OFFICE 2,505,876

ELECTRIC STORAGE BATTERY

George L. Baker, Boulder, Colo., assignor of one-half to Oliver I. Taylor, Boulder, Colo.

Application January 17, 1947, Serial No. 722,532

3 Claims. (Cl. 136—6)

This invention relates to an improved construction of storage battery or accumulator and has particular reference to providing a battery or accumulator which will be extremely light in weight and inexpensive to manufacture thereby greatly increasing the capacity of the accumulator or storage battery relatively to the weight thereof, in comparison to storage batteries now in conventional use.

It is a primary object of the present invention to provide an electrical accumulator or storage battery wherein the conventional lead plates are replaced by lead or a similar substance in a finely divided form so that a far greater proportion of the surface area of the element is exposed to the electrolyte of the battery, than occurs when the element is in the form of a solid plate.

Still another object of the invention is to provide an improved construction of accumulator or storage battery wherein due to the greatly reduced weights of the elements of the battery or cell, the need for heavy separators is eliminated and in lieu thereof, separators of extremely light weight and which may be porous can be utilized, thus further reducing the size and weight of the cell.

Still a further object of the invention is to provide a storage battery capable of utilizing a plurality of elements or coils, connected in series and separated by light weight seperators of insulating material and which are porous to permit the passage of the electrolyte therethrough and so that the electrolyte will more thoroughly intermingle with the elements or coils.

Other objects and advantages of the invention will hereinafter become more fully apparent from the following description of the drawings, illustrating preferred embodiments thereof, and wherein:

Figure 1 is a substantially vertical, central sectional view of a storage battery or accumulator and showing one embodiment of the invention including a positive and a negative coil;

Figure 2 is a horizontal or transverse sectional view thereof taken substantially along a plane as indicated by the line 2—2 of Figure 1;

Figure 3 is perspective view of one of the coils or elements thereof;

Figure 4 is a side elevational view, partly in vertical section showing one of the coils or elements of the accumulator of Figure 1 mounted on a spindle or base;

Figure 5 is a longitudinal, vertical sectional view of another embodiment of the storage battery including a plurality of positive and negative coils connected in series;

Figure 6 is a cross sectional view of the battery of Figure 5 taken substantially along a plane as indicated by the line 6—6 of Figure 5;

Figure 7 is an exploded view showing one of the coils and one of the porous separators of the battery of Figures 5 and 6;

Figure 8 is a view similar to Figure 5 of another embodiment of the invention;

Figure 9 is a cross sectional view of the battery or accumulator of Figure 8 and taken substantially along a plane as indicated by the line 9—9 of Figure 8;

Figure 10 is a perspective view on an enlarged scale of a portion of the battery of Figures 8 and 9;

Figure 11 is a fragmentary perspective view of one of the separators of the battery of Figures 8 and 9;

Figure 12 is a horizontal sectional view taken substantially along a plane as indicated by the line 12—12 of Figure 13 and showing another embodiment of the storage battery;

Figure 13 is a longitudinal vertical sectional view taken substantially along a plane as indicated by the line 13—13 of Figure 12;

Figure 14 is a fragmentary perspective view showing one electrode and its separator of another embodiment of the storage battery;

Figure 15 is a cross sectional view thereof; and

Figure 16 is a perspective view of one of the elements or electrodes, shown in Figures 14 and 15.

Referring more specifically to the drawings and first with reference to Figures 1 to 4, the numeral 18 designates generally a casing or jar of an electrical accumulator or storage battery, designated generally 19. The casing or jar 18 may be formed of any suitable material such as glass, rubber, waterproofed wood, or other electrical insulating material. Contained within the casing 18 is a base 20 having an upstanding spindle 21, which parts are likewise formed of electrical insulating material. One coil or element 22 of the battery 19 is disposed around the spindle 21 and supported by the base 20. The coil or element 22 is preferably formed of the commercial product known as "lead wool" or may be formed of lead in any other suitable form such as shot or may be formed of lead oxide fiber. Assuming that the coil or element 22 is formed of lead wool, which may be impregnated with oxide and/or peroxide, said lead wool is twisted into a strand which is wound helically around the spindle 21 and has one end thereof extending through the top wall of the container 18 and connected to a terminal or post 23. A second coil or element 24 which may be similarly or identically formed is wound helically around the coil 22 and is separated therefrom by a cylindrical separator 25 of insulating material. One end of the strand or element 24 extends through the top wall of the container 18 and is connected to a terminal or post 26. The container 18 is substantially filled with an electrolyte 21 which, due to the construction of the coils 22 and 24 will percolate through the twisted strands thereof and be in contact with a much greater proportion by weight of the surface of said coils 22 and 24 than would be possible if the coils or elements were formed such as a conventional solid lead plate of a battery. It will thus be seen that the battery 19 comprises two coils or elements and it will be readily obvious that one of the posts or terminals will constitute a positive terminal while the other will constitute the negative terminal of the battery or cell.

Figures 5, 6 and 7 illustrate another embodiment of the invention comprising a storage battery, designated generally 27 having a plurality of positive and negative loops connected in series and including an insulating container or casing 28 provided with a bottom loop support, designated generally 29 and a top loop support, designated generally 30. The supports 29 and 30 extend to the ends of the casing 28 to preclude longitudinal movement of said supports within the casing, and the top support 30, as seen in Figure 6, also extends to and abuts against the side walls of the casing 28 to preclude any lateral displacement thereof. The bottom support 29 is provided with a plurality of longitudinally spaced transverse orifices 31 which extend horizontally therethrough and the top support 30 is provided with a longitudinally extending perpendicularly-disposed slot 32. The battery 27 includes a plurality of loops or elements 33, each corresponding in construction to the elements 22 and 24. Each of the elements 33 has an intermediate portion positioned in one of the orifices or recesses 31, as seen in Figure 6, and the end portions of each element 33 extend upwardly and have terminals thereof anchored in the slot 32. Interposed between the individual elements or loops 33 are separators 34, formed of a porous insulating material such as felt and which are shaped substantially to conform to the shape of the applied loops 33, as seen in Figure 7. Each separator 34 has a substantially flat bottom edge 35 adapted to rest upon the bottom support 29 and a restricted upper portion 36, which is disposed in the slot 32. The alternate loops 33 are connected by conductors 37 to a positive post or terminal 38 and the loops or elements 33, disposed therebetween, are connected by a conductor 39 to a negative post 40; said posts projecting from the top wall of the casing 28. As illustrated, the battery 27 contains an uneven number of loops or elements 33 so that one more loop thereof is connected to the positive post 38 than to the negative post 40. The container 28 is substantially filled with an electrolyte 41 which intermingles intimately with the individual threads of the twisted loop strands 33 and which seeps through the separators 34 and is free to pass under the bottom support 29.

A cell or storage battery, designated generally 42, and comprising another embodiment of the invention as illustrated in Figures 8 to 11 and includes an insulated container or casing 43 provided with a plurality of separable and separate separators 44, each of which is formed of electrical insulating material. The separators 44 each comprise an elongated bar or block having an upwardly opening groove 45 extending from end-to-end thereof. The separators 44 are provided with a plurality of horizontal and perpendicular bores 46 which communicate with the groove 45 and which open outwardly of the sides and bottom of the separator to facilitate the free passage of electrolyte to and from said grooves. The separators 44 are stacked in superposed relationship in the casing 43 and if necessary, a separator 47, comprising a substantially flat bar having perpendicular bores 48 may be interposed between the uppermost separator 44 and the top wall of the container 43. The groove 45 of each separator 44 contains an element 49, preferably of a construction corresponding to the elements 22, 24 and 33 and which is disposed longitudinally thereof. Alternate elements 49 project from corresponding ends of the separators 44 and those projecting from the left-hand ends of the separators, as seen in Figure 8, are connected to a positive terminal or post 50 by a conductor 51, and those projecting from the opposite ends of the separators are connected to a negative post 52 by a conductor 53. As illustrated in Figures 8 and 9, an odd number of elements 49 may be provided, in which case one more element will be connected to the positive post 50 than to the negative post 52. The container 43 is substantially filled with an electrolyte 54 which, by passing through the bores 46 may intermingle intimately with the individual threads of the twisted strands forming the elements 49 so that a large part of the mass thereof will be in contact with the electrolyte.

Figures 12 and 13 illustrate an electrical accumulator or storage battery, designated generally 55 and constituting a variation of the storage battery 19 and by means of which the capacity thereof is greatly increased.

The storage battery 55 includes a casing 56 having a base extending substantially the length thereof and designated 57 and which is provided with spaced upstanding spindles 58. The base 57 and spindles 58 are formed of electrical insulating material and each of said spindles is surrounded by a plurality of concentric cylinders of porous insulating material such as felt or glass cloth; in the embodiment as illustrated, each spindle 58 being provided with three concentric separator cylinders 59, 60 and 61. Around each spindle 58 is disposed three helical coils or elements 62, 63 and 64 which are wound respectively around the spindle 58 within the separator 59, around the separator 59 and within the separator 60, and around the separator 60 and within the separator 61, as clearly illustrated in Figure 12. The casing 56 contains an electrolyte 65 which percolates through the separators 59, 60 and 61 and around and between the threads of the lead wool coils 62, 63 and 64. As seen in Figure 13, the inner coils 62 are each connected by a conductor 66, having branches 67 to a positive post or terminal 68. The outer coils or elements 64 are likewise connected by conductors 69 to the positive terminal 68, and the intermediate coils 63 are connected by conductors 70 to a negative terminal or post 71. It will be readily obvious that the additional coils thus provided will increase the current capacity of the accumulator or cell 55.

Instead of the parts as shown contained in the casing 56, an electrical accumulator or storage battery could be formed with two corresponding units 72, one of which is shown in Figures 14 and 15. The unit 72, forming one electrode or element of a storage battery, comprises a plurality of twisted strands of lead wool or the like, each designated generally 73 and each of which strands 73 is individually wound within and contained by a tube 74 formed from a length of tape 75, which may be formed of felt or glass cloth. A bundle of lead wool strands 73, thus wound in tape 75, are then wrapped or packaged in a wrapper 76 of an insulating material, which may correspond to the tape 75, and so that the ends of the lead wool strands 73 will be exposed. Two of the packages or units 72 may then be placed in the container 56 and each of the strands 73 of one unit 72, connected by a conductor 77 to the post 68 and the strands 73 of the other unit, not shown, connected by a similar conductor, not shown, to the post 71. The glass cloth or felt separators 74 and 76 will permit the electrolyte, contained in the casing 56 to pass readily therethrough and into contact with the individual threads of the strands 73, for the same purpose as previously described.

Various other modifications and changes are likewise contemplated and may obviously be resorted to, without departing from the spirit or scope of the invention as hereinafter defined by the appended claims.

I claim as my invention:

1. An electrical accumulator or storage battery comprising a casing of electrical insulating material containing an electrolyte and having externally disposed positive and negative terminals, two elongated loops disposed in said casing and formed of lead, one of said loops being connected to the positive terminal and the remaining loop being connected to the negative terminal, a bottom loop supporting bar supported in said casing adjacent the bottom thereof and having orifices for engaging the intermediate portions of the loops, an upper loop supporting bar supported in said casing adjacent the top thereof and provided with orifices in which the ends of the loops are detachably anchored, and a porous separator element interposed between said loops and supported by the top and bottom coil supporting bars for retaining said loops out of electrical contact with one another, said separator element being porous to permit the electrolyte to pass therethrough for contacting the loops.

2. An electrical accumulator or storage battery as in claim 1, said separator element being shaped to correspond substantially to the shape of the loops and including a relatively wide lower part supported on the bottom bar and a restricted upper portion positioned in the upper bar between the ends of the two loops.

3. In an electrical accumulator or storage battery of the character described, a casing of electrical insulating material containing an electrolyte, said casing having externally disposed positive and negative terminals, at least two loops disposed in said casing, each of said loops comprising lead in a rope-like form, means for supporting the loops in electrically insulated relationship to one another, said means being constructed and arranged to permit the electrolyte to pass therethrough and therearound for intermingling with the loops and for contacting the individual particles thereof, the loop or loops of one polarity being connected to one of the terminals and the loop or loops of the opposite polarity being connected to the other terminal, said means including a bottom bar having orifices through which intermediate portions of the loops extend and an upper bar having a slot in which the ends of each loop is anchored, and a porous separator element interposed between said loops and supported by said top and bottom bars.

GEORGE L. BAKER.

REFERENCES CITED

The following references are of record in the file of this patent:

UNITED STATES PATENTS

| Number | Name | Date |
| --- | --- | --- |
| 309,838 | Faure | Dec. 30, 1884 |
| 461,823 | Entz et al. | Oct. 27, 1891 |
| 514,267 | Legay et al. | Feb. 6, 1894 |
| 518,966 | Phillips et al. | May 1, 1894 |
| 719,937 | Ford | Feb. 3, 1903 |
| 1,156,315 | Rowley | Oct. 12, 1915 |
| 1,409,895 | Knoblock | Mar. 14, 1922 |

FOREIGN PATENTS

| Number | Country | Date |
| --- | --- | --- |
| 93,944 | Austria | Aug. 10, 1923 |